Feb. 14, 1961    H. U. MÜLLER    2,971,262
METHOD AND MEANS FOR CHECKING THE
CIRCUMFERENCE OF ROUND OBJECTS
Filed June 13, 1957    2 Sheets-Sheet 2
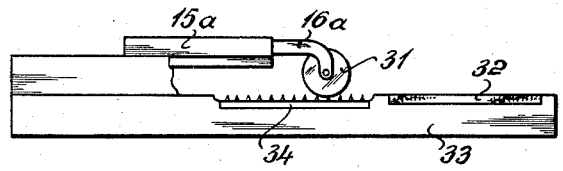
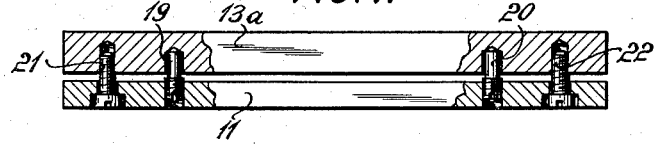
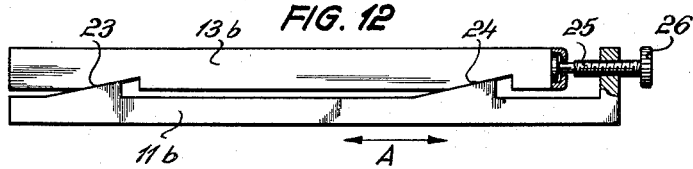
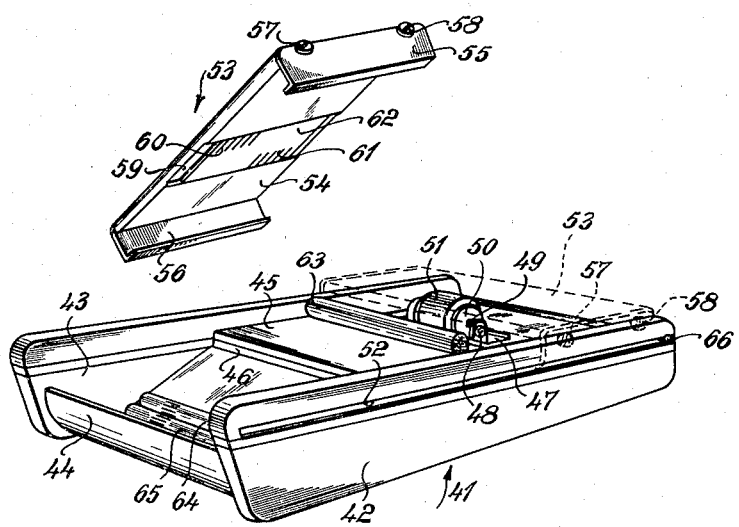
INVENTOR:
Hans Ulrich Müller
By [signature]
Patent Agent

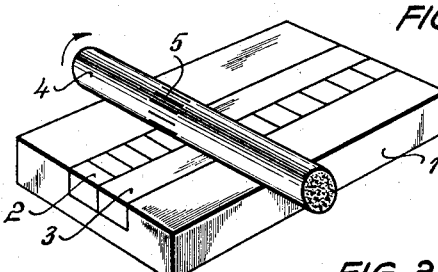
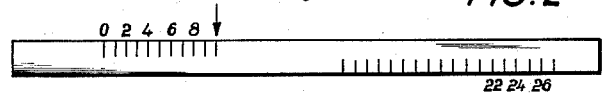
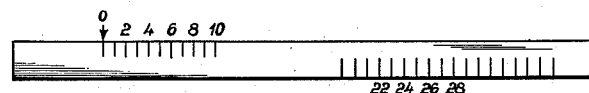
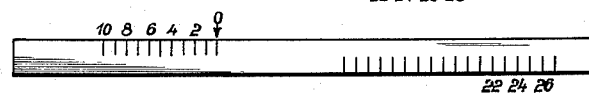
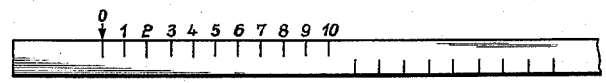
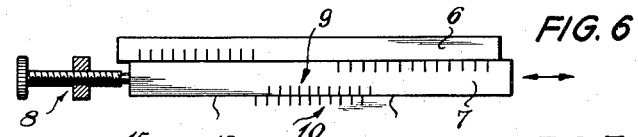
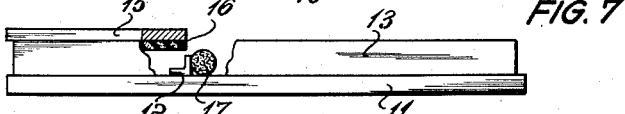
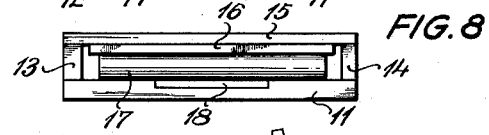
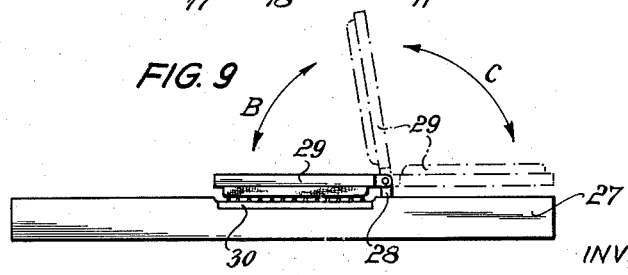

United States Patent Office 2,971,262
Patented Feb. 14, 1961

2,971,262

METHOD AND MEANS FOR CHECKING THE CIRCUMFERENCE OF ROUND OBJECTS

Hans Ulrich Müller, 269 Elbchaussee, Hamburg-Altona, Germany

Filed June 13, 1957, Ser. No. 665,469

Claims priority, application Germany June 13, 1956

11 Claims. (Cl. 33—125)

This invention related to a method of comparative checking and precision measurement of the circumference of soft or presure-yielding cylindrical or rod-shaped objects, for example cigarettes and lengths of cigarette filter, and to means adapted for carrying out the said method. The invention provides the possibility of simple and at all times easily-performable checking of the cross-section of such cylindrical objects and enables divergences from a prescribed circumference or cross-section to be determined without difficulty.

The possibility of making a check of the foregoing character is of particular importance as regards the checking of rod-shaped bodies which, owing to the way in which they are manufactured, are subject to variations of circumference. A notable example is cigarettes the filling of which, consisting of soft elastic tobacco, is accommodated in a substantially yielding tube.

Even when modern cigarette-making machines are employed, complete uniformity of the tobacco content of cigarettes cannot be obtained. Differences in the weight of the filling of tobacco always arise, these differences being of the order of magnitude of ± 100 g. per thousand cigarettes, so that the determination of the weight of the tobacco content of a cigarette does not yield a comparative value which is valid for all the cigarettes of a batch. It is therefore necessary to determine this comparative value continuously by taking measurements of the size, that is the length and diameter, of the cigarettes.

Checking the length does not cause any difficulty either in the case of fresh cigarettes or in the case of cigarettes which are ready for packing.

On the other hand, it is very difficult to determine the diameter of cigarettes. A number of proposals have already been made which are intended to enable the thickness dimensions of cigarettes to be checked continuously or at intervals by mechanical means. Thus, for example, it is known to introduce cigarettes or cigarette filters in succession into the holes in a perforated gauge for the purpose of measuring the size, so as to find in this way the hole having the diameter corresponding to the diameter of the body to be tested. These measurements, it is true, can be carried very rapidly, but the degree of accuracy thereof is insufficient.

Greater accuracy can be obtained by pushing the paper tube, from which the tobacco has been emptied, over a conical side-rod having a diameter and/or circumference scale engraved thereon. This method, however, is very time-consuming, since the tobacco must be removed carefully from the tube. Moreover the result of the measurement is considerably influenced by the sensitiveness of touch and experience of the person performing the test and the degree of elasticity of the paper which, as is known, depends not only on the type of paper, but also on the moisture content of the paper at any given time.

In the case of filter-tipped cigaretes this method cannot be employed since the filling of tobacco cannot be removed without damaging the tube.

In another of the known methods of measuring the size of cigarettes or cigarette filters the tube is cut open and the width of the cut-open tube, that is, therefore, indirectly the circumference of the test body, is then determined in a suitable device. It is true that in this method the uncertain factor of the elasticity of the paper is eliminated but the cutting open of the tube, which must be done very carefully, is a time-consuming operation and moreover a costly optical reading device is required. The proposal has recently been made to determine the circumference of such rod-shaped objects by roling them, preferably a several times, starting from a check mark on their circumference, relatively to a measuring strip provided with a graduated scale, the value obtained being divided by the number of rolling operations.

The present invention provides a method which, as regards accuracy and the speed with which it can be carried out, is equivalent to this last-mentioned proposal, which does not yet belong to the state of the art and can be carried into effect by means of a substantially simpler apparatus.

According to the invention a graduated scale consisting of two separate scales, one of which is the vernier of the other, is printed on the circumference of the test object, the size and vernier scales being so located with respect to one another that after they have been printed on the periphery they lie adjacent one another. The printing of the scales is preferably effected by rolling the test body on an inked graduated scale.

The simplest form of construction of means for carrying out the method accordance to the invention is characterised by a base plate provided with at least two scales set, etched or engraved into it and over which the test body is rolled by hand or by mechanical means.

Further details of the features of the invention will become apparent from the following description of embodiments thereof.

In the accompanying drawings:

Figures 1 is a perspective view of a device for carrying out the method according to the invention, Figures 2 to 5 show various possible ways of arranging the measuring scales, Figures 6 shows an arrangement having scales adapted to be displaced with respect to one another, Figure 7 illustrates in side elevation a device for carrying out the method according to the invention, the device being shown partly broken open, Figure 8 is a vertical cross-section through the device shown in Figure 7, Figure 9 is a side elevation of a second embodiment of the device comprising an arrangement for inking the measuring scale, Figure 10 shows an arrangement similar to that illustrated in Figure 9 and comprising a different device for inking the scale, Figure 11 shows an arrangement for adjusting the printing scales, Figure 12 shows an arrangement similar to that illustrated in Figure 11 but having a different adjusting device, and Figure 13 shows a practical embodiment of the invention, the slidable cover carrying the graduated scale being shown removed.

In the simplest case, illustrated in Figure 1, the novel method is carried out by means of a plate 1 which carries two scales 2, 3 on top, the scales being set or etched into the plate 1. These scales are inked so that the scale markings, for example 5, are printed onto the test body 4 which is rolled along the plate 1. Thus, a measuring of the object or body is obtained by means of printing scales thereon which can be read or checked at any time, in any place and as often as desired without further measuring operation. In this way the danger of reading and recording incorrect measured values is fundamentally eliminated. The measured test body on which the result has been printed can be preserved for later checks at any time.

The number system consisting of the two scales 2 and 3 arranged adjacent one another may be calibrated in units of length or in units of length divided by one scale, for example 3, serving as the size or measuring scale and the other scale, for example 2, serving as the vernier for the first scale.

The scales can be so located with respect to one another that the line of the measuring scale, for example 3, corresponding to the required size of the test body comes within the range of the vernier scale, for example 2, after being printed on the circumference of the test body 4. Since the zero points of the measuring scale are difficult to find on the round shape, the lines of the measuring scale are expediently provided with the millimetre numbers of the required size, while the vernier scale is marked with the numbers 1 to 10. Although it is possible to read the diameter immediately when scales graduated in $\pi$ mm. are employed, graduation in millimetres only is to be preferred since it results in more accurate measurements.

Figures 2 to 5 show various measuring scales, the scale shown in Figure 5 being divided into $\pi$ mm.

If the measuring range is unmistakable as, for example, in the case of the scale shown in Figure 5, it is sufficient for only the lines of one of the two scales to be numbered. It is also to be noted that the size scale need not be complete, as indicated in Figures 2 to 5.

A further possible scale arrangement for the device according to the invention is shown in Figure 6. The two scales 6, 7 are adapted to be displaced with respect to one another by means of a small driving means 8 secured to the displaceable scale 7. The apparatus can be adjusted to the desired prescribed size with the aid of the two auxiliary scales 9, 10. The lower scale 10 is embedded in plate 1 in a manner similar to the scale 6 which is oppositely disposed. The displaceable scale 7 is adjusted by means of the driving means 8, for example, a set screw, as shown. Thus, the coincidence of the two scales on the test body does not give the absolute measurement but the difference above or below the required size. If a certain tolerance is permitted and if the corresponding scale lines are marked the rejected test bodies can be recognized immediately without any difficulty and conversion.

Figures 7 and 8 show a device which is particularly suitable for carrying into effect the method according to the invention. On a base plate 11 a stop bar 12 is mounted between the side walls 13 and 14. On these side walls there is slidably arranged a small slide or slide plate 15 which, by means of a pad 16 made, for example, of sponge rubber or other soft material, bears on the test body 17 which is rolled along over the inked scale 18 sunk or embedded into the plate 11. It is, of course, to be understood that the device of Figure 7 may be readily provided with the scale arrangement of Figure 6. Thus, the body or plate 11 would be provided with a displaceable scale 7 and auxiliary scales 9, 10 in a manner already described in the discussion of Figure 6.

At the commencement of the measuring operation, the test body 17 is caused to rest against the stop bar 12 and the slide 15 is pressed firmly on to the side walls 13 and 14 serving as slide rails and is then moved along the plate 11 parallel to the scales 18. In this way the test body is rolled cleanly over the previously inked scale system 18 and the scales are printed onto the circumference of the test body. Figures 11 and 12 show devices by means of which it is possible to alter the distance of the slide from the plate 11. It will be seen in Figure 11 that the side wall 13a is mounted on the plate 11 by means of adjusting screws 19, 20 and 21, 22 so that by adjusting the screws the side walls 13a, and similarly the opposite side wall (not shown), can be correspondingly raised or lowered. In the form of construction shown in Figure 12 this adjustment of the height of the side wall 13b is effected by means of inclined plane surfaces 23, 24 arranged in the base plate 11b and the side wall 13b, the side wall 13b being connected with a screw drive 25 by means of which it can be moved to and fro in the direction of the double arrow A while, owing to the inclined plane surfaces 23, 24, it is simultaneously raised or lowered according to the direction of rotation of the milled head 26 of the screw 25.

Figure 9 shows an inking device for an arrangement designed for carrying out the method according to the invention. On the base plate 27 there is provided a pair of brackets 28 which pivotally carry an ink-pad 29 which can be swung in the direction of the arrows B and C and is applied to the scales 30 in the position shown in full lines in the drawing. As is apparent, the inking device of Figure 9 can be readily employed with the device of Figure 7. In this case, the pad 29 would be pivotally secured to the base plate 11 by means of the brackets 28.

Figure 10 shows another arrangement in the form of a double arm 16a provided in the slide 15a which functions in a manner similar to slide 15 of Figure 7 and which carries at its end a roller 31, which, on being drawn back, transfers the ink picked up from the ink pad 32 to the scales 34 embedded into the base plate 33. The ink pad 32 and the ink pad 29 are preferably inked with a slow-drying printing ink.

Figure 13 shows an embodiment, as used in practice, of means according to the invention for comparative checking and precision measurement of the circumference of soft or pressure-yielding cylindrical or rod-shaped objects, in the present case cigarettes and lengths of cigarette filter material. On a frame 41 having two lateral runner or skid-like boundary walls 42, 43 there is provided a cradle-like receiving tray 44 and a pad 45 is mounted on a transverse support 46. An extension of the support 46 for the pad 45 is provided with an aperture 47 through which there passes a resiliently mounted support 48 holding a roller 50 in a shaft 49. This roller 50 carries on its outer edge a pad 51 which is inked. The support 48 is mounted on a spring plate secured to the underside of the transverse support 46 so that its height can be adjusted by means of an adjusting screw not shown in the drawing. A slide 53, which is indicated in broken lines and is also shown above the frame 41 from below after being removed from the latter, is adapted to be moved along guide rails 52. The slide 53 is composed of a transverse portion 54 to which two side pieces 55, 56 are secured by means of screws 57, 58. In its bottom surface the transverse portion 54 has a recess 59 into which a plate 62 carrying the measuring scales 60, 61 is set.

The device operates as follows. When the slider 53 is pushed back into the position shown in broken lines in Figure 13, the measuring scales 60, 61 are provided with ink by means of the inked pad 51. A test object 63, for example a cigarette or a length of cigarette filter material, is now placed on the pad 45 which preferably consists of foam or sponge rubber. The slider 53 is then pushed to the left in Figure 13, the test object 63 rolling on the pad 45 and the inked measuring scales 60, 61 being printed on to the said test object in the process, as shown in the case of the two test objects 64, 65 in the tray 44.

A stop for limiting the rearward movement of the slider 53 is indicated at 66.

It will be understood that the invention is not limited to the embodiments described in detail above and illustrated in the drawings, but may be varied in many respects without departing from the basic idea thereof.

I claim:

1. An apparatus for comparative checking and precision measurement of the circumference of soft or pressure-yielding cylindrical objects, comprising in combination a base plate having formed thereon two sets of graduations consisting of at least two scales one of which is the vernier of the other, and means for rolling a test object over said scales to print said scales on the circumference of said test object.

2. An apparatus according to claim 1, wherein a stop bar is provided located at the beginning of the vernier.

3. An apparatus according to claim 1, comprising an inking device for said two sets of graduations, said inking device comprising an ink pad, and pivot mounting means for said ink pad to enable it to be moved into and out of contact with said scales.

4. An apparatus according to claim 1, comprising an inking device for said two sets of graduations, said inking device comprising an ink pad disposed in alignment with said scales, and an applicator roller capable of rolling over said ink pad when the test object is displaced, said roller running over said scales when retracted.

5. An apparatus for comparative checking and precision measurement of the circumference of soft or pressure-yielding cylindrical objects, comprising in combination a base plate having two sets of graduations consisting of at least two scales one of which is the vernier of the other, means for rolling a test object over said scales to print said scales on the circumferences of said test object, and means for displacing said scales with respect to one another.

6. An apparatus according to claim 5, wherein said scale displacing means comprises fine adjustment drive means to effect said displacement of the scales with respect to one another, and two auxiliary scales.

7. An apparatus for comparative checking and precision measurement of the circumference of soft or pressure-yielding cylindrical objects, comprising in combination a base plate having at least two sets of graduations consisting of at least two scales one of which is the vernier to the other, means for rolling a test object over said scales to print said scales on the circumference of said test object, boundary walls by which said base plate is enclosed laterally, and said means comprising a slide movable over said base plate upon said boundary walls which serve as running rails for said slide.

8. An apparatus according to claim 7, wherein said slide is covered on its side facing the test object with a soft resilient material.

9. An apparatus according to claim 7, comprising means for adjusting the height of said running rails with respect to said base plate.

10. An apparatus according to claim 7, comprising adjusting screw means for adjusting the height of said running rails with respect to said base plate.

11. An apparatus according to claim 7, comprising adjusting drive means acting in the direction of said running rails to raise and lower said running rails on inclined plane surfaces with respect to said base plate.

References Cited in the file of this patent

UNITED STATES PATENTS

| | | |
|---|---|---|
| 190,589 | Horton | May 6, 1877 |
| 2,133,920 | Goessling | Oct. 18, 1938 |
| 2,183,230 | Treece et al. | Dec. 12, 1939 |
| 2,564,657 | George | Aug. 21, 1951 |
| 2,636,370 | Kramer | Apr. 28, 1953 |
| 2,742,705 | Gelardi | Apr. 24, 1956 |

FOREIGN PATENTS

| | | |
|---|---|---|
| 572,120 | Great Britain | Sept. 24, 1945 |